United States Patent [19]

Tamai

[11] 4,357,614

[45] Nov. 2, 1982

[54] INK PARTICLE JETTING DEVICE FOR MULTI-NOZZLE INK JET PRINTER

[75] Inventor: Masayoshi Tamai, Kanagawa, Japan

[73] Assignee: Fuji Xerox Co., Ltd., Tokyo, Japan

[21] Appl. No.: 265,315

[22] Filed: May 20, 1981

[30] Foreign Application Priority Data

Oct. 7, 1980 [JP] Japan ............................... 55-139407

[51] Int. Cl.³ ............................................. G01D 15/18

[52] U.S. Cl. .................................. 346/75; 346/140 R

[58] Field of Search .............................. 346/75, 140 IJ

[56] References Cited

U.S. PATENT DOCUMENTS 3,921,916 11/1975 Bassous ............................ 346/75 X
3,925,791 12/1975 Hunt ................................ 346/75 X
4,007,464 2/1977 Bassous et al. ............. 346/140 IJ X
4,014,029 3/1977 Lane et al. ........................ 346/75 X
4,047,184 9/1977 Bassous et al. ........................ 346/75
4,106,975 8/1978 Berkenblit et al. ........ 346/140 IJ X
4,106,976 8/1978 Chiou et al. ................ 346/140 IJ X
4,112,436 9/1978 Cone .............................. 346/140 IJ

*Primary Examiner*—George H. Miller, Jr.
*Attorney, Agent, or Firm*—Sughrue, Mion, Zinn, Macpeak & Seas

[57] ABSTRACT

An ink particle jetting device for a multi-nozzle ink jet printer in which a plurality of silicon chips having nozzle arrays formed therein are mounted on a substrate having a plurality of holes therein with the nozzle arrays confronting the holes of the substrate. The substrate is preferably rectangularly shaped having rectangular holes parallel to one another and inclined with respect to the sides of the substrate. Two nozzles may confront each hole of the substrate. The two nozzles which confront a single hole in the substrate may fall along a line on the chip parallel to the sides of the chip or be inclined with respect to the sides. If desired, the sides of the adjacent chips may be cut to provide a high density arrangement.

7 Claims, 5 Drawing Figures

INK PARTICLE JETTING DEVICE FOR MULTI-NOZZLE INK JET PRINTER

BACKGROUND OF THE INVENTION

The present invention relates to a ink particle jetting device for a multi-nozzle ink jet printer.

In a multi-nozzle ink jet of the type using two charge values, ink particles which are not used for printing are charged. The charged ink particles are deflected perpendicularly to the direction of the jet while passing through a deflection field which is produced by deflecting electrodes and are collected by a gutter. On the other hand, the ink particles which are used for printing are not charged. Accordingly, these ink particles pass straightly through the deflection field and strike a recording medium thus recording a dot thereon.

The quality of a print formed by the ink particles depends on whether or not the accuracy in the printing position of inks drops is high. Therefore, it is essential that the nozzles have a high jet direction accuracy. Heretofore, in manufacturing a nozzle array having a high jet direction accuracy, a technique whereby a stainless steel plate is drilled with a small diameter drilling machine or a technique whereby a single crystal of silicon is drilled by etching it by photolithography has been extensively employed.

The former is advantageous in that a long nozzle array having a length substantially equal to the width of a recording sheet can be formed and the nozzles have a considerably uniform diameter. However, there is a drawback in that the jet direction accuracy is of the order of ±0.2° and accordingly the deviation in printing position on the recording medium is relatively large, 70 μm.

On the other hand, the latter technique is advantageous in that the jet direction accuracy is high because the holes are cut in a single crystal of silicon taking into account the crystal orientation thereof. A nozzle array in accordance with the second technique has been tested and found to have a jet direction accuracy of the order of ±0.06° with a corresponding deviation on the recording medium of 20 μm. The quality of a print made with this nozzle array is considerably high. However, it should be noted that the technique is nonetheless disadvantageous in that is is difficult to manufacture a long nozzle array.

wafers having a major diameter of about 100 mm have recently been manufactured using semiconductor techniques. Therefore, a nozzle array 100 mm in length can be manufactured from a wafer. However, it is difficult to form 800 nozzles with a density of eight nozzles/mm in a wafer with a major diameter of about 100 mm because it is necessary to make the accuracy in thickness of the wafer at least in the array direction higher than the dimensional accuracy (usually about 1 μm) of the nozzle and it is difficult to polish a wafer having a diameter of 100 mm with an accuracy higher than the above-described accuracy. Futhermore, the manufacture of the nozzles from the wafer must be carried out using photolithography. However, it is practically impossible using presently- known techniques to achieve using photolithography an economical yield.

SUMMARY OF THE INVENTION

Accordingly, an object of the invention is to provide an ink particle jetting device having a high accuracy by manufacturing a long nozzle array from a single crystal of silicon.

In accordance with this and other objects, the invention provides a long ink particle jetting device which is formed by mounting a plurality of silicon chips in which nozzle arrays are formed on a substrate having a plurality of holes in such a manner that the nozzle arrays confront the holes of the substrate.

Preferably, the substrate is rectangularly shaped with the holes also being rectangular and being parallel to one another but with their longitudinal axes inclined with respect to the sides of the substrate. The silicon chips preferably have two nozzles confronting each of the holes of the substrate. The two nozzles confronting one of the holes of the substrate may be in a line parallel to the sides of the chip or in a line inclined with respect to the sides of the chip. In a high density arrangement, the sides of the adjacent chips may be cut to accomodate one another.

DESCRIPTION OF THE PREFERRED EMBODIMENTS

The invention will be described with reference to preferred embodiments thereof.

Figure 1:
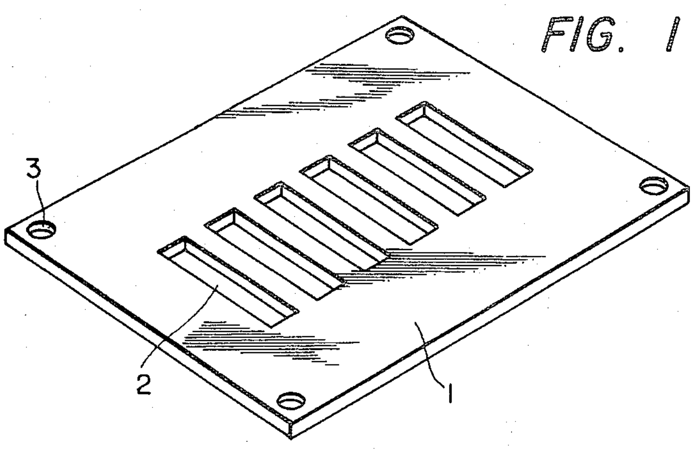
FIG. 1 is a perspective view of a substrate, which is one of the components which form an ink particle jetting device according to the invention.

FIG. 1 is a perspective view showing a substrate employed with the invention. The substrate 1 has holes 2 formed therein through which ink jets pass. The holes 2 may be circular; however, in order to prevent the substrate from being clogged by low speed ink droplets which tend to be created when the jets are started or stopped, it is desirable that the holes 2 be rectangular and that the area of each hole 2 be as large as possible. The substrate 1 further has holes 3 for mounting a jet head. The ink from the jet head is sealed by sealing members such as O-rings which are provided on the surface of the substrate and on the jet head.

Figure 2:
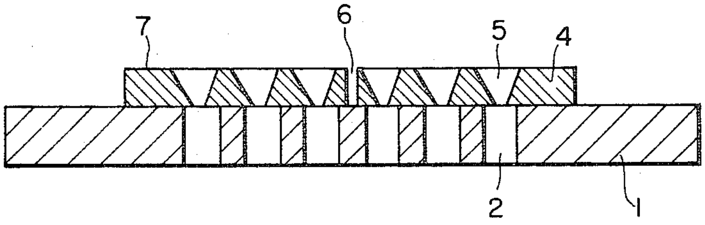
FIG. 2 is a sectional view showing a first preferred embodiment of an ink particle jetting device according to the invention.

A cross-sectional view of a preferred embodiment of an ink particle jetting device according to the invention is shown in FIG. 2. The ink particle jetting device includes the substrate 1 and a plurality of silicon nozzle chips 4 and 7 (hereinafter referred to merely as "chips 4 and 7" when applicable). The chips 4 and 7 are mounted on the substrate 1. The ink particle jetting device is mounted so that the chips 4 and 7 communicate with the interior of an ink chamber. In this connection, the chips 4 and 7 are so disposed that the gap 6 between the chips 4 and 7 is located between two adjacent holes 2. Therefore, no ink can pass through the gap 6 between the chips 4 and 7.

In the embodiment shown in FIG. 2, each nozzle is so arranged that its larger opening is to the outside and its smaller opening is to the inside of the assembly, that is, each nozzle is directed "forwardly". However, the ink jetting effect is not affected at all even if the nozzles are directed backwardly.

In cutting a wafer for the chips, it is desirable to use a carbide blade. The cutting surface is held at right angles to the surface of the wafer. It is to be noted that a chip cut by a carbide blade has a much more excellent plane accuracy than one cut by laser-scribing. Therefore, the use of carbide blade cutting is essential in a case when a large number of chips are required.

As is apparent from the above description, in the embodiment shown in FIG. 2, a number of chips having small silicon nozzles formed therein are arranged on the substrate so as to form a long nozzle array, namely, a long ink particle jetting device. As described above, the silicon nozzles have a high accuracy jet direction. Therefore, the use of a long nozzle array constructed according to the invention provides prints of very high quality.

Figure 3:
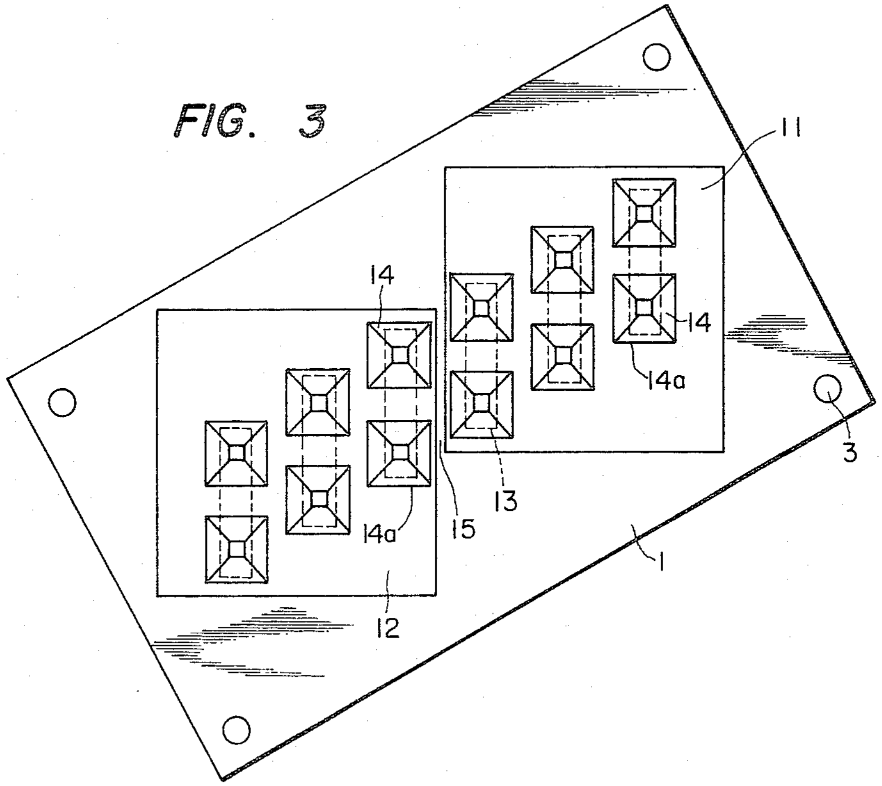
FIG. 3 through FIG. 5 are plan views showing other embodiments of ink particle jetting devices according to the invention.

Another embodiment of an ink particle jetting device according to the invention is shown in FIG. 3. The ink particle jetting device in FIG. 3 is suitable for two nozzle arrays. In FIG. 3, reference numeral 13 designates rectangular holes cut in a substrate 1, 11 and 12 silicon nozzle chips (hereinafter referred to merely as "chips 11 and 12" when applicable) mounted on the substrate 1, and 14 nozzles formed in the chips 11 and 12.

For two nozzle arrays, the nozzles are staggered. Therefore, it is necessary that the rectangular holes 13 cut in the substrate 1 be inclined with respect to the axis of the arrays. Futhermore, the nozzles 14 are cut in the chips 11 and 12 in such a manner that sides 14*a* thereof are inclined with respect to the axis of the arrays.

In general, a chip which is obtained by slicing a silicon wafer with a carbide blade is rectangular and the nozzles cut in the chip 11 are also rectangular. Furthermore, each nozzle is cut in such a manner that its four sides are parallel to the four sides of the chip 11. Accordingly , if the nozzles 14 cut in the chips 11 and 12 are arranged in two lines as shown in FIG. 3 and the chips 11 and 12 are inclined with respect to the sides of the substrate 1, then two nozzles 14 can be communicated with one rectangular hole 13 in the substrate 1. By mounting the chips 11 and 12 on the substrate 1 as described above, the nozzles 14 are provided in a staggered arrangement. Furthermore, as the chips 11 and 12 can be mounted on the substrate 1 so that one side of each of the chips 11 and 12 is parallel to the relevant sides of the rectangular holes 13, the chips 11 and 12 can be arranged so that they do not overlap one on another at the boundary 15 therebetween, Thus, the rectangular chips 11 and 12 can be used without modification to their configuration, which permits the use of a carbide blade in slicing the silicon wafer.

Figure 4:
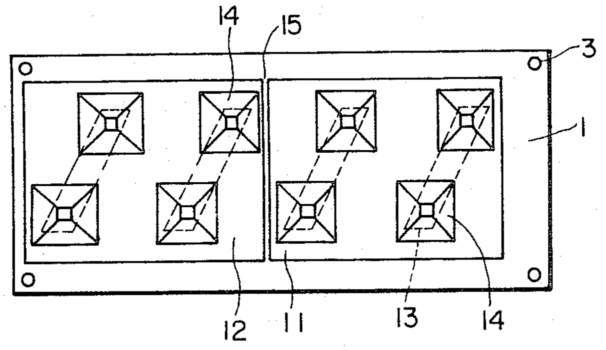
Figure 5:
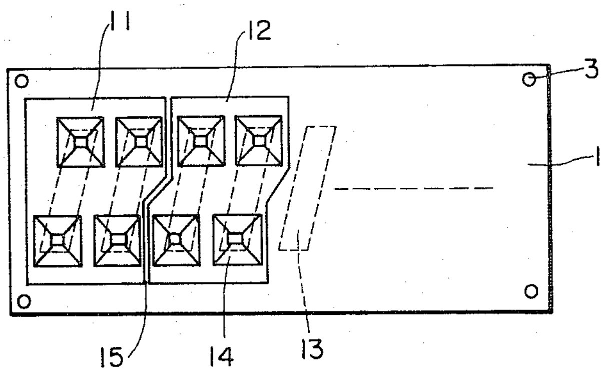

If a low density nozzle arrangement is desired, it is unnecessary to incline the chips 11 and 12 with respect to the sides of the substrate 1. That is, the chips 11 and 12 can be arranged as shown in FIG. 4, and the rectangular chips 11 and 12 can again be used without modification. On the other hand, if it is required to mount the chips 11 and 12 parallel to the sides of the substrate 1 to provide a high nozzle arrangement density, the chips 11 and 12 would overlap one another at the boundary. Therefore, in this case, it is necessary that the portions of the chips 11 and 12 corresponding to the overlapping boundary be cut as shown in FIG. 5.

If, as shown in FIG. 3, the chips 11 and 12 are mounted on the substrate 1 inclined with respect to the substrate 1, the chips 11 and 12 do not overlap even if the nozzle arrangement density is increased. Accordingly, in this embodiment, rectangular chips can be employed. Thus, the embodiment of FIG. 3 is considerably effective for forming the ink particle jetting device.

In the above-described embodiments, two chips are shown mounted on the substrate; however, it should be noted that the invention is not limited thereto or thereby. That is, the technical concept of the invention is equally applicable to cases where more than two chips are mounted on the substrate.

As is apparent from the above description, according to the invention, a long nozzle array and hence long ink particles jetting device can be formed using a single silicon crystal. The ink particle jetting device according to the invention has a high jet direction accuracy, and therefore the use of the device provides prints of very high quality.

What is claimed is:

1. An ink particle jetting device for a multi-nozzle ink jet printer comprising: a substrate having a plurality of holes formed therein; and a plurality of silicon chips in which nozzle arrays are formed, said plurality of silicon chips being mounted on said substrate in such a manner that said nozzle arrays confront said holes of said substrate.

2. An ink particle jetting device for a multi-nozzle ink jet printer comprising: a substantially rectangular substrate having a plurality of rectangular holes formed therein, said holes having a longitudinal axis substantially parallel to one another and inclined with respect to sides of said substrate; and a plurality of silicon chips in which nozzle arrays are formed, said plurality of silicon chips being mounted on said substrate in such a manner that said nozzle arrays confront said holes of said substrate.

3. The ink particle jetting device of claim 2 wherein gap portions between adjacent silicon chips are covered by solid areas of said substrate between said holes in said substrate.

4. The ink particle jetting device of claim 3 wherein two nozzles in corresponding ones of said silicon chips confront each of said holes in said substrate.

5. The ink particle jetting device of claim 4 wherein each of said silicon chips is substantially rectangular and wherein nozzles confronting one of said holes of said substrate are in a line parallel to longitudinal sides of said hole.

6. The ink particle jetting device of claim 4 wherein said silicon chips are substantially rectangular and wherein first and second nozzles confronting one of said holes in said substrate are located in a line inclined with respect to sides of said chip.

7. The ink particle jetting device of claim 4 wherein said silicon chips have two parallel sides and first and second nozzles confronting one of said holes of said substrate are in a line inclined with respect to said parallel sides, sides of said chips adjacent another of said chips being cut to accomodate the adjacent chip wherein a high density nozzle array is provided.

* * * * *